April 25, 1967  F. J. HOHL  3,315,790
ACCUMULATING TRANSFER CONVEYOR FOR CYLINDRICAL OBJECTS
Filed Oct. 12, 1964

INVENTOR.
FRANK J. HOHL
BY
Christel & Bean
ATTORNEYS

United States Patent Office 3,315,790
Patented Apr. 25, 1967

3,315,790
ACCUMULATING TRANSFER CONVEYOR FOR
CYLINDRICAL OBJECTS
Frank J. Hohl, Snyder, N.Y., assignor to Hohl Machine
& Conveyor Co., Inc., Buffalo, N.Y.
Filed Oct. 12, 1964, Ser. No. 403,205
6 Claims. (Cl. 198—168)

This invention relates generally to the conveyor art, and more specifically to a new and useful transfer and accumulating conveyor for cylindrical objects such as lengths of pipe.

Pipe sections and other objects of cylindrical form often are transferred by rolling the same along a supporting surface. However, a problem arises because of the tendency of such objects to roll faster at one end than the other and cant out of line.

It is known to roll cylindrical objects along a supporting surface by conveyor means moving in the direction of rolling and carrying transfer rollers which project above the supporting surface substantial distance to engage behind a cylindrical object and propel it along the supporting surface. Such transfer rollers customarily are spaced above the supporting surface, to engage the object being conveyed at a point about in line with the axis of the object.

While such conveyors satisfactorily transfer pipe and other cylindrical objects, they do not and cannot accumulate such objects. If an object being transferred is held against forward movement, the conveyor must be stopped. If it is not, either damage or loss of control, or both, will result because the object being held block the conveyor.

However, frequently it is desired to temporarily accumulate the objects being transferred, and it is inconvenient and inefficient to have to transfer such objects to a separate accumulator, or to interrupt the conveyor operation.

Accordingly, the primary object of this invention is to provide a transfer conveyor for pipe and other cylindrical objects which also can be used as an accumulator therefor without stopping the conveyor.

Another object of this invention is to provide an accumulating transfer conveyor for cylindrical objects which will resume transfer of the objects automatically upon ending the accumulating operation.

Still another object of this invention is to provide the foregoing in a construction which is relatively simple and inexpensive, and which is durable and dependable in operation.

In one aspect thereof, an accumulating transfer conveyor for generally cylindrical objects constructed in accordance with this invention is characterized by the provision of a transfer surface supporting cylindrical objects for movement therealong, and means for moving cylindrical objects along the transfer surface including a transfer roller movable through a transfer path adjacent the transfer surface, the roller projecting above the transfer surface a relatively slight distance sufficient to engage a cylindrical object and roll the same along the transfer surface while enabling the roller to pass beneath a cylindrical object restrained against such rolling movement.

The foregoing and other objects, advantages and characterizing features of an accumulating transfer conveyor of this invention will become apparent from the following detailed description of an illustrative embodiment thereof, and a modification, reference being made to the accompanying drawing depicting the same wherein like reference numerals denote like parts throughout and wherein.

Figure 1:
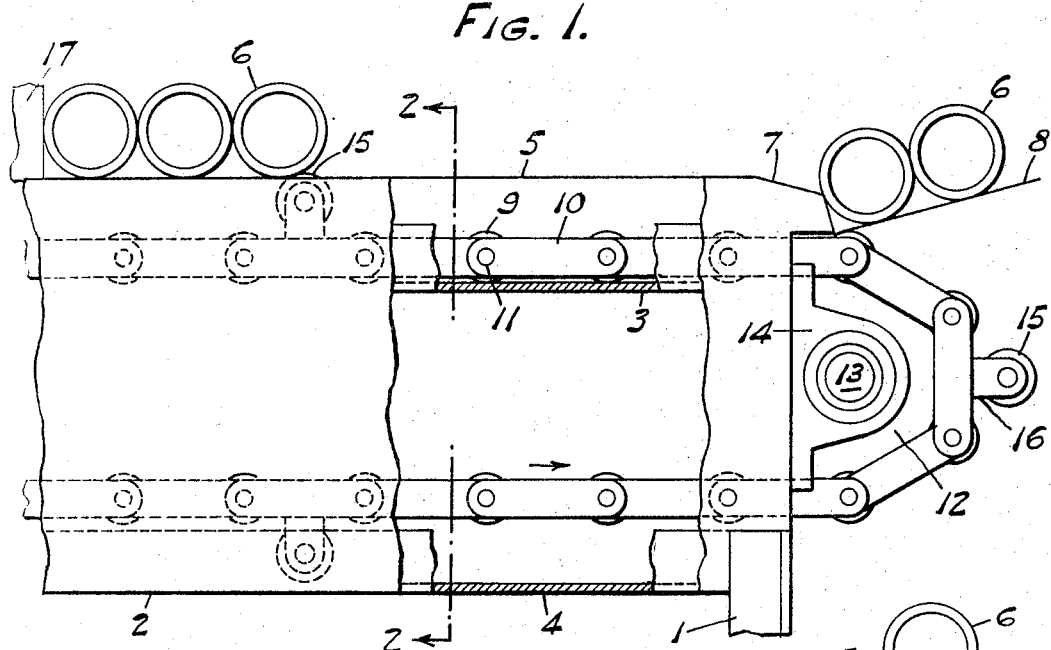
FIG. 1 is a view, partly in side elevation and partly in vertical section, showing an accumulating transfer conveyor of my invention as it appears in use, parts being broken away for ease of illustration.
Figure 2:
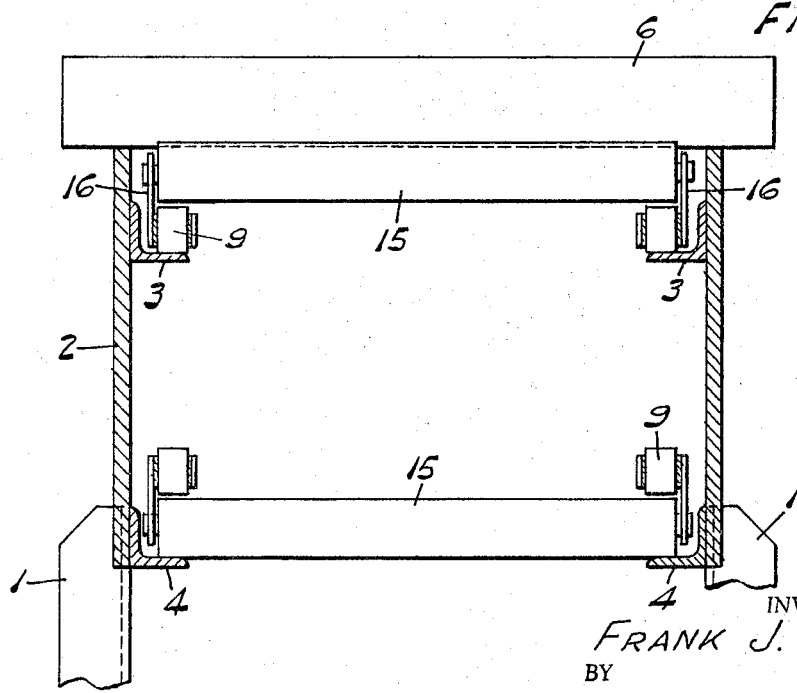
FIG. 2 is a vertical sectional view thereof, taken about on line 2—2 of FIG. 1.

Referring now in detail to the illustrative embodiment depicted in FIGS. 1 and 2 of the accompanying drawing, there is shown an accumulating transfer conveyor of my invention comprising a supporting framework including angle member uprights 1 at each of four corners, only two of which are shown, and opposite side plates 2 extending between the corner uprights 1 on opposite sides of the conveyor. A pair of upper, conveying flight supporting tracks are provided, in the form of angle members 3 secured to the side wall plates 2, and a pair of lower, return flight supporting tracks are provided in the form of angle members 4 secured to plates 2 and to uprights 1. The tracks 3 and 4 extend in parallel relation to each other lengthwise of the conveyor.

The upper edges of side wall plates 2 provide a supporting surface in the form of parallel, horizontal transfer tracks 5 along which objects of generally cylindrical form, such as the pipe sections shown at 6, can be rolled. The transfer tracks 5 have an inclined ramp portion 7 up which the cylindrical members 6 are rolled, as from a delivery ramp 8, onto tracks 5.

A pair of endless roller conveyor chains are provided, comprising rollers 9 connected by links 10 pivoted thereto and journaled by the connecting pivot pins 11, such roller chains per se being of a type known in the art. Chains 9, 10 engage over drive wheels 12 carried on a shaft 13 journaled in brackets 14 mounted on the side wall plates 2 at the forward end of the conveyor framework. Any suitable drive means, not shown, can be provided for rotating the drive wheel members 12, and a pair of corresponding, idler wheel members, not shown, are provided at the opposite end of the conveyor framework.

Transfer rollers 15 span the conveyor chains at spaced points therealong. The transfer rollers are journaled on brackets 16 carried by corresponding links 10 of the paired chains 9, 10, whereby the transfer rollers 15 are mounted on the paired conveyor chains for movement therewith.

With the conveyor chains moving in the direction of the arrow, counter clockwise as viewed in FIG. 1, successive transfer rollers 15 engage behind the lowermost pipe section 6 on loading ramp 8 and roll the same up ramp 7 onto the transfer tracks 5. The transfer rollers 15 project above the transfer tracks 5 to engage behind pipe sections 6 and roll the same along tracks 5. The transverse alignment of the transfer rollers 15 maintains the pipe sections properly transversely oriented relative to the direction of movement along transfer tracks 5.

It is a particular feature of my invention that cylindrical objects such as shown at 6 also can be accumulated on transfer tracks 5, without interrupting operation of the conveyor and without loss of control over the accumulating objects. If a removable stop 17 or other barrier is interposed in the path of movement of the objects 6, preventing continued movement thereof, the objects simply accumulate on the transfer tracks 5, with transfer of the objects resuming automatically upon removal of the barrier.

This is accomplished with my invention by providing transfer rollers which barely project above tracks 5, instead of projecting well above the supporting surface as in conventional transfer conveyors of this general type. Thus, whereas conventional transfer rollers engage behind the objects being conveyed at an elevation approaching the radius of the objects, with my invention the transfer rollers 15 project only slightly above the transfer surface 5, just enough to overcome the rolling resistance of the objects being conveyed. This is considerably less than the radius of the objects being conveyed. Indeed, it is substantially less than the radius of the transfer roller 15 itself. I have found, for example, that the desired operation can be achieved with cylindrical objects having a radius from ½" to 24" and a weight of ½ lb. to 500 lbs. when the projection of transfer rollers 15 above surface 5 is in the range of approximately 0.005 inch to approximately 0.0625 inch. This is with a transfer roller radius of, for example, 2 to 3 inches.

With the transfer rollers 15 projecting above transfer tracks 5 only to the extent required to overcome the resistance to rolling of pipe sections 6 therealong if forward movement of the pipe sections is prevented the transfer rollers 15 will pass beneath the pipe sections, which latter rise for example no more than the necessary one-sixteenth of an inch. The rollers 15 roll beneath the pipe sections in a manner such that the pipe sections are not disturbed, but are accumulated in controlled relation. In other words, I have discovered that rollers 15 need not project way above tracks 5 in order to roll objects 6 therealong, and that when rollers 15 project above tracks 5 only to the extent required to roll objects 6 therealong, the transfer rollers will roll beneath the objects being transferred if the latter are held against rolling. The passage of rollers 15 beneath the accumulated objects does not significantly disturb them, any tendency toward misalignment being corrected by succeeding rollers 15. When the stop 17 is removed, the transfer rollers will resume transfer of the objects automatically, starting with the forwardmost pipe section 6 at the left of FIG. 1, with succeeding transfer rollers picking up successive ones of the accumulated pipe sections.

While the transfer rollers 15 project only slightly above the transfer tracks 5 their elevation above ramp 7 and the lower end of ramp 8 is greater, thereby providing the added lever moment necessary to meet the greater resistance to rolling of the pipe sections upwardly from ramp 8 onto and along ramp 7. The conveyor chain rollers 9 engage tracks 3 to maintain the desired projection of transfer rollers 15 above tracks 5 on the conveying flight. On the return flight, rollers 15 enage the tracks 4 to support the conveyor chains.

Figure 3:
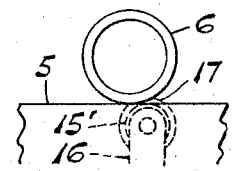
FIG. 3 is a fragmentary, side elevational view showing a modified transfer roller construction.

In the modified construction shown in FIG. 3, there is provided a transfer roller 15' which, instead of being a solid section as in FIGS. 1 and 2, has a resiliently yieldable tread 17. The transfer roller 15' projects slightly above tracks 5 in the same manner as roller 15, for transferring objects 6 along the tracks. However, when accumulating objects 6 on tracks 5, the roller treads 17 yield as the roller passes beneath the object, as shown in FIG. 3, enabling the transfer roller to roll under the object without lifting the object 6. To this end, tread 17 must have sufficient strength to overcome the rolling resistance of objects 6, while being resiliently yieldable to the requisite extent, e.g. 0.005–0.0625 inch, under the weight of an accumulated object. Otherwise, the operation of the form shown in FIG. 3 is the same as described in connection with the embodiment of FIG. 1 and 2. Tread 17 can comprise, for example, an encircling sleeve or tire of solid rubber or other elastomeric material of proper durometer or a pneumatic rubber construction.

Accordingly, it is seen that my invention fully accomplishes its intended objects. While I have shown and described in detail but two embodiments thereof, that has been done by way of illustration only, without thought of limitation.

Having fully disclosed and completely described my invention, and its mode of operation, what I claim as new is:

1. A transfer and stacking conveyor for objects of generally cylindrical form comprising a framework providing supporting tracks on opposite sides thereof, a pair of movable roller conveyor chains supported by said supporting tracks, brackets carried by said chains at correspondingly spaced points therealong, transfer tracks along which cylindrical objects can be rolled, said transfer tracks being generally parallel to each other and to said supporting tracks, and transfer rollers mounted between corresponding pairs of said brackets for movement therewith, said transfer rollers extending at generally a right angle to said transfer tracks and projecting slightly thereabove to engage behind cylindrical objects and roll the same along said transfer tracks, the projection of said transfer rollers above said transfer tracks being sufficient to overcome the resistance to rolling of an object along said transfer tracks while enabling said transfer rollers to roll beneath cylindrical objects held against rolling movement along said transfer tracks.

2. An accumulating transfer conveyor as set forth in claim 1, together with a downwardly inclined ramp at one end of said transfer tracks, said transfer rollers projecting above said ramp a greater distance than above said transfer tracks to move cylindrical objects upwardly along said ramp to said transfer tracks.

3. An accumulating transfer conveyor as set forth in claim 1, wherein said transfer rollers project above said transfer tracks a distance substantially less than the radius of said transfer rollers.

4. An accumulating transfer conveyor as set forth in claim 1, wherein said transfer rollers each have a resiliently yieldable tread.

5. An accumulating transfer conveyor as set forth in claim 1, wherein said resiliently yieldable tread comprises substantially solid elastomeric material.

6. An accumulating transfer conveyor as set forth in claim 1, wherein said resiliently yieldable tread comprises a pneumatic sleeve.

References Cited by the Examiner
UNITED STATES PATENTS

| | | | |
|---|---|---|---|
| 722,689 | 3/1903 | Frink | 198—183 |
| 1,209,021 | 12/1916 | Phillips | 198—173 |
| 1,358,167 | 11/1920 | Levin | 198—170 |
| 1,436,295 | 11/1922 | Shumaker | 198—173 |
| 1,856,733 | 5/1932 | Shepherd | 198—19 |
| 2,007,910 | 7/1935 | Stephens | 198—192 |
| 2,990,941 | 7/1961 | Peras | 198—170 |
| 3,176,828 | 4/1965 | Sullivan | 198—127 |

FOREIGN PATENTS 528,161  10/1940  Great Britain.

EVON C. BLUNK, *Primary Examiner.*

RICHARD E. AEGERTER, *Examiner.*